(12) United States Patent
Gokturk

(10) Patent No.: US 6,700,230 B1
(45) Date of Patent: Mar. 2, 2004

(54) LINEAR ACTUATOR

(75) Inventor: Halit S. Gokturk, Mountain View, CA (US)

(73) Assignee: Matsushita Electric Works, Ltd., Kadoma (JP)

( * ) Notice: Subject to any disclaimer, the term of this patent is extended or adjusted under 35 U.S.C. 154(b) by 0 days.

(21) Appl. No.: 10/273,131

(22) Filed: Oct. 18, 2002

(51) Int. Cl.$^7$ ................................................ H02K 41/00
(52) U.S. Cl. ............................ 310/12; 310/13; 310/14
(58) Field of Search ............................ 310/12, 13, 14, 310/152, 156.38, 156.39, 156.4, 156.41; 355/229, 230

(56) References Cited

U.S. PATENT DOCUMENTS

| | | | | |
|---|---|---|---|---|
| 3,296,471 A | * | 1/1967 | Cochardt | ............... 310/154.46 |
| 3,828,213 A | * | 8/1974 | Yamashita et al. | ........... 310/254 |
| 6,236,125 B1 | * | 5/2001 | Oudet et al. | .................... 310/12 |
| 6,249,065 B1 | * | 6/2001 | Oudet et al. | .................... 310/33 |
| 6,518,681 B2 | * | 2/2003 | Ogino | .......................... 310/12 |

* cited by examiner

*Primary Examiner*—Nicholas Ponomarenko
*Assistant Examiner*—Leda Pham
(74) *Attorney, Agent, or Firm*—Oblon, Spivak, McClelland, Maier & Neustadt, P.C.

(57) ABSTRACT

A linear actuator includes a moving part which has a facing surface and which is provided such that the facing surface of the moving part faces a facing surface of a stator. The moving part is lonearly movable. A permanent magnet is provided in one of the stator or the moving part and has a magnet surface facing the facing surface of another of the stator or the moving part. A cross-sectional area of the permanent magnet along a first plane substantially in parallel with the facing surface of the one of the stator or the moving part reduces toward the magnet surface.

18 Claims, 9 Drawing Sheets

LINEAR ACTUATOR

BACKGROUND OF THE INVENTION

1. Field of the Invention

The present invention relates to a linear actuator.

2. Discussion of the Background

Unexamined Japanese patent publication (Kokai) Hei 11-341778 discloses a linear actuator. The contents of this application are incorporated herein by reference in their entirety.

Referring to FIG. 1, the linear actuator 2 includes a cylindrical stator 4, a coil 6, and a moving part 8 which is linearly movable. The stator 4 includes first and second permanent magnets (10 and 12). The cross-sections of the permanent magnets (10 and 12) are rectangular. The moving part 8 is positioned by a spring 16.

SUMMARY OF THE INVENTION

According to one aspect of the present invention, a linear actuator includes a stator having a facing surface, at least one moving part having a facing surface, a coil provided in the stator, at least one moving part, and an elastic member elastically supporting the at least one moving part. The at least one moving part is provided such that the facing surface of the at least one moving part faces the facing surface of the stator. The at least one moving part is linearly movable with respect to the stator. At least one permanent magnet is provided in one of the stator or the at least one moving part and has a magnet surface facing the facing surface of another of the stator or the at least one moving part. A cross-sectional area of the at least one permanent magnet along a first plane substantially in parallel with the facing surface of the one of the stator or the at least one moving part reduces toward the magnet surface.

According to another aspect of the present invention, an electric appliance including a linear actuator. The linear actuator includes a stator having a facing surface, at least one moving part having a facing surface, a coil provided in the stator, at least one moving part, and an elastic member elastically supporting the at least one moving part. The at least one moving part is provided such that the facing surface of the at least one moving part faces the facing surface of the stator. The at least one moving part is linearly movable with respect to the stator. At least one permanent magnet is provided in one of the stator or the at least one moving part and has a magnet surface facing the facing surface of another of the stator or the at least one moving part. A cross-sectional area of the at least one permanent magnet along a first plane substantially in parallel with the facing surface of the one of the stator or the at least one moving part reduces toward the magnet surface.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
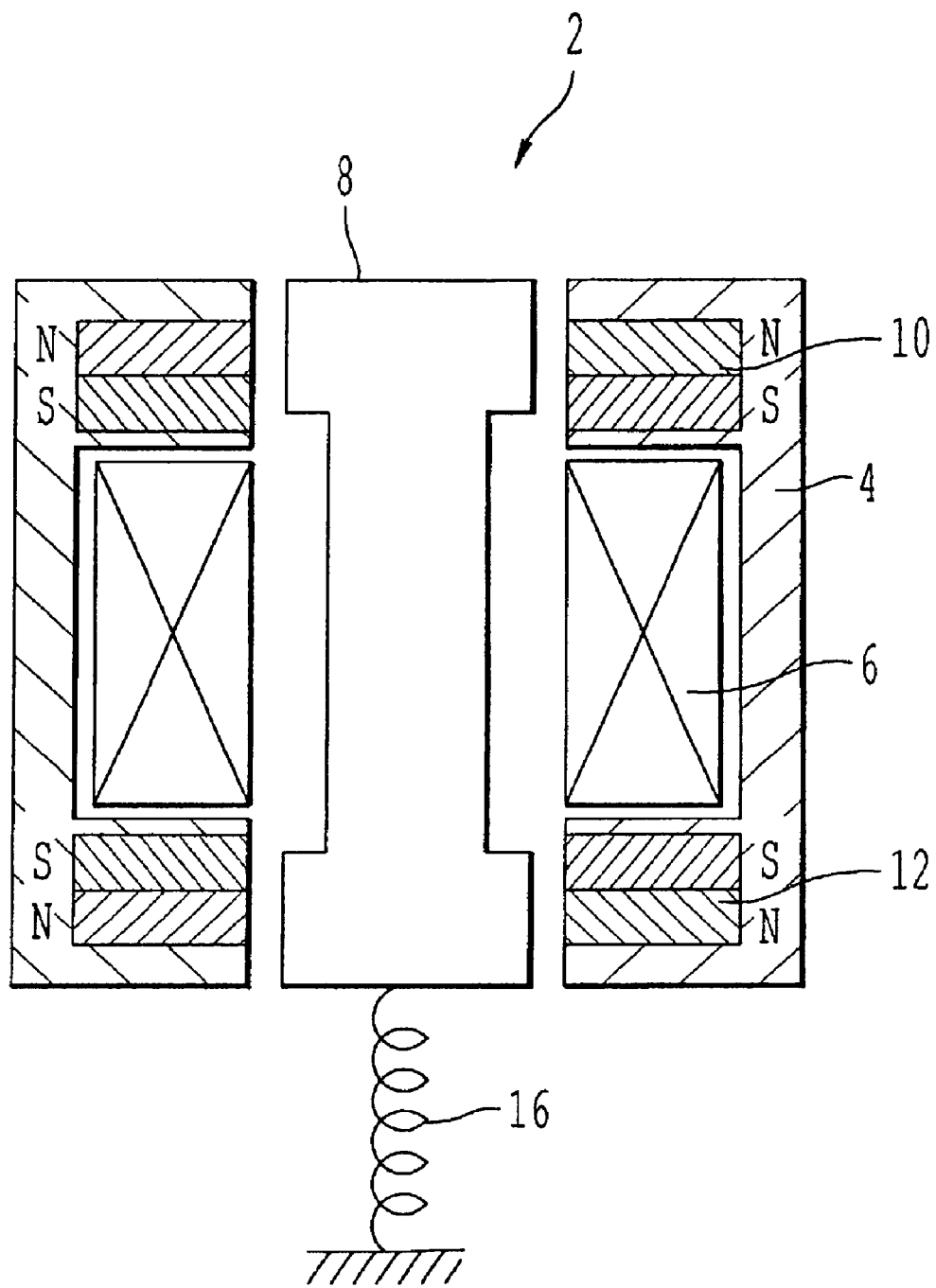
FIG. 1 is a cross-sectional view of a linear actuator of background art.

The embodiments will now be described with reference to the accompanying drawings, wherein like reference numerals designate corresponding or identical elements throughout the various drawings.

Figure 2:
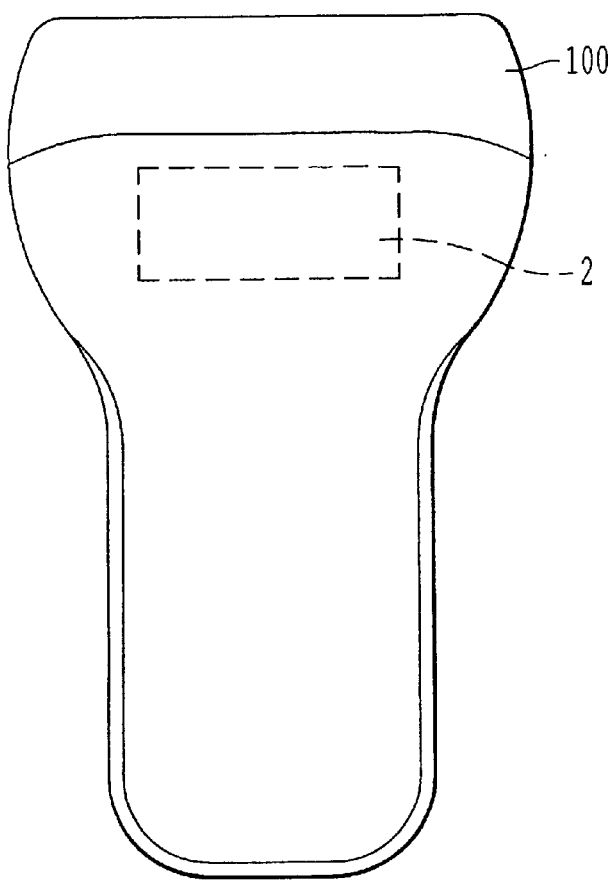
FIG. 2 is a schematic elevational view of an electric shaver including a linear actuator according to an embodiment of the present invention.

A linear actuator is utilized for electrical appliances, for example, an electric shaver, an electric toothbrush and the like. Referring to FIG. 2, an electric shaver 100 includes a linear actuator 2 which is configured to move blades provided in the electric shaver 100.

Figure 4B:
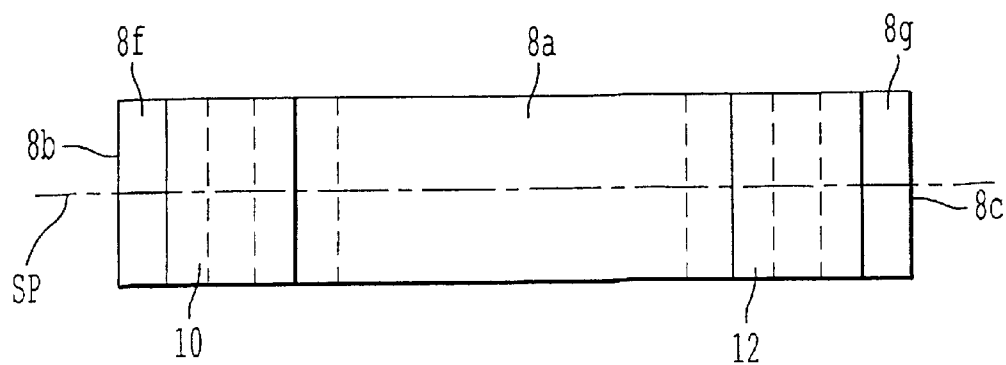
FIG. 4(b) is a top plan view of the linear actuator according to the first embodiment of the present invention.
Figure 3:
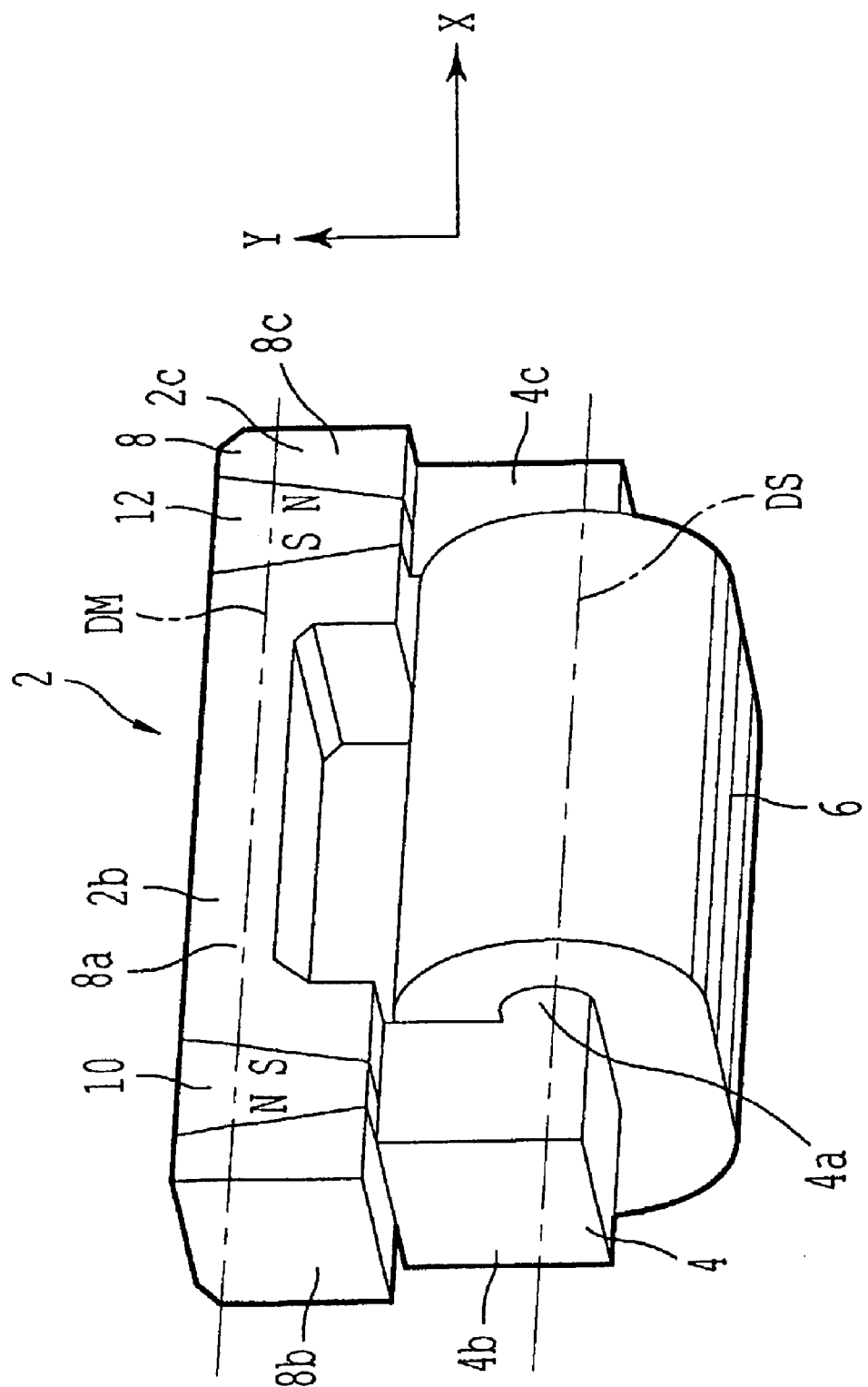
FIG. 3 is a perspective view of a linear actuator according to a first embodiment of the present invention.
Figure 4A:
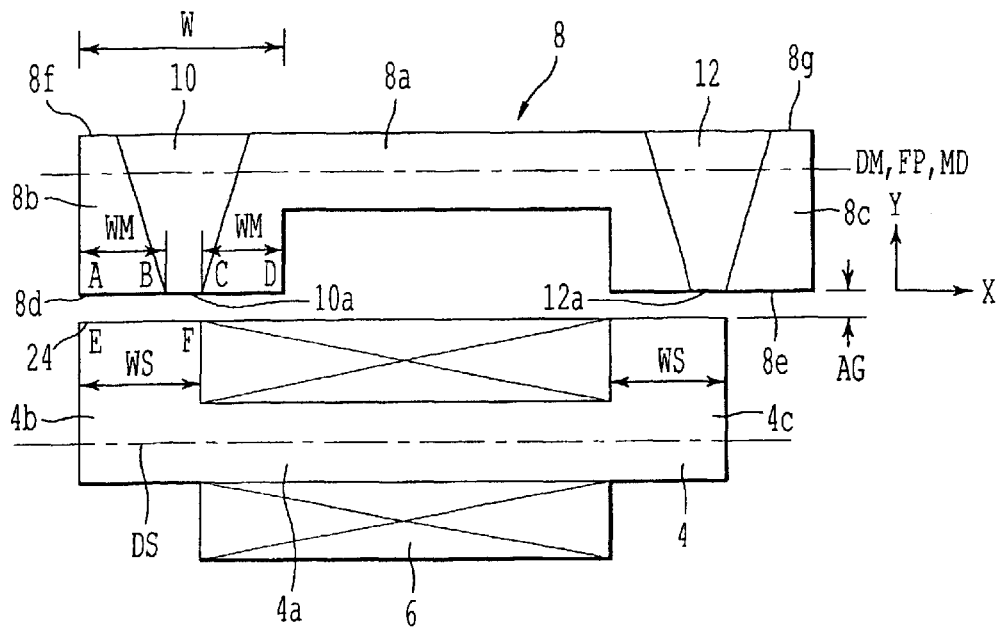
FIG. 4(a) is a cross-sectional view of the linear actuator according to the first embodiment of the present invention.
Figure 5A:
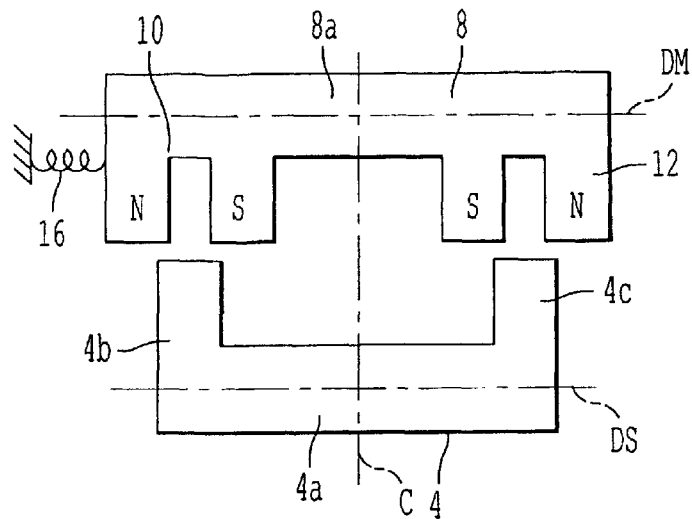
FIGS. 5(a)–5(c) are schematic views to explain the basic operation of the linear actuator.

Referring to FIGS. 3, 4(a) and 5(a), the linear actuator 2 includes a stator 4, a coil 6, and a moving part 8. The stator 4 is made of a soft magnetic material of high permeability. The stator 4 has a U-shaped cross-section which has first and second side portions (4b and 4c) and a connecting portion (4a) connecting the first and second side portions (4b and 4c). The coil 6 is wound around the connecting portion (4a) of the stator 4. When current is supplied to the coil 6, magnetic fields are generated. The moving part 8 also has a U-shaped cross section which has first and second side portions (8b and 8c) and a connecting portion (8a). The moving part 8 is provided such that a longitudinal direction (DM) of the connecting portion (8a) of the moving part 8 extends substantially in parallel with a reciprocal moving direction (MD) of the moving part 8 and a longitudinal direction (DS) of the connecting portion (4a) of the stator 4 and such that facing surfaces (8d and 8e) of the first and second side portions (8b and 8c) of the moving part 8 face the first and second side portions (4b and 4c) of the stator 4, respectively, with an air gap (AG). The moving part 8 is linearly movable along an X-direction or the longitudinal direction (DM) of the connecting portion (8a) of the moving part 8. The moving part 8 is elastically supported by a spring 16 (see FIG. 5(a)). Therefore, the moving part 8 is configured to reciprocally move along the X-direction.

The moving part 8 is made of soft magnetic material and includes first and second permanent magnets (10 and 12) provided in the first and second side portions (8b and 8c), respectively. The first and second side portions (8b and 8c) and the connecting portion (8a) of the moving part 8 guide the magnetic field lines emanating from the permanent magnets (10 and 12) and the coil 6. The first and second permanent magnets (10 and 12) are magnetized substantially along the longitudinal direction (DM) of the connecting portion (8a) of the moving part 8. The magnetization directions of the first and second magnets (10 and 12) are opposite. Namely, the first and second permanent magnets (10 and 12) are provided such that, for example, magnetic poles are arranged to be in order of N-S-S-N from left to right in FIG. 5(a).

Referring to FIGS. 4(a) and 4(b), cross-sectional areas of the first and second permanent magnets (10 and 12) along a first plane (FP) substantially in parallel with the facing surfaces (8d and 8e) of the moving part 8 reduce toward the magnet surfaces (10a and 12a) along a Y-direction which is perpendicular to the X-direction. In the present embodiment, the cross-section of each of the first and second permanent magnets (10 and 12) along a second plane (SP) substantially in parallel with a reciprocal moving direction (MD) of the moving part 8 and substantially perpendicular to the first plane (FP) is a trapezoid whose narrower base is on the at least one magnet surfaces (10a and 12a). The narrower base is a shorter side of two parallel sides of the trapezoid. Each of the first and second permanent magnets (10 and 12) is provided such that a narrower base (10a and 12a) of the trapezoid is positioned substantially on the facing surface (8d and 8e) of the first and second side portions (8b and 8c) of the moving part 8 and a wider base of the trapezoid is positioned substantially on the back surface (8f and 8g) of the first and second side portions (8b and 8c). The wider base is a longer side of two parallel sides of the trapezoid.

The thickness (the Y-direction) of the connecting portion (8a) of the moving part 8 is smaller than that of the first and second side portions (8b and 8c) of the moving part 8, because magnetic fields become weaker as the distance from the magnets increases.

Figure 5B:
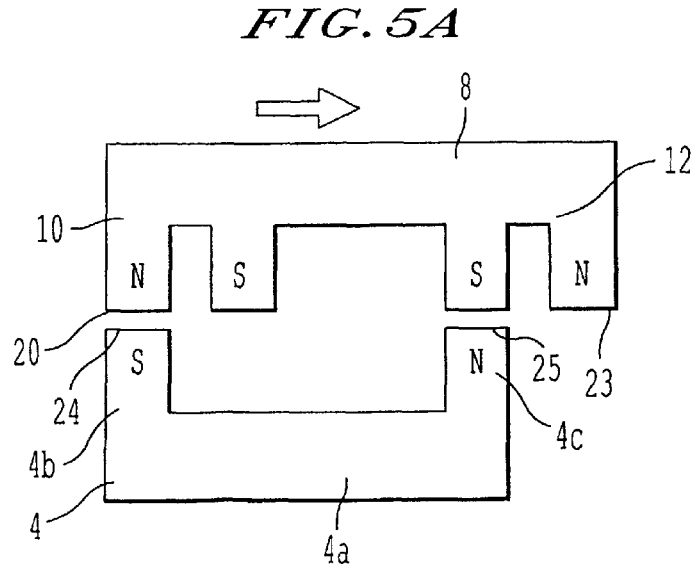
Figure 5C:
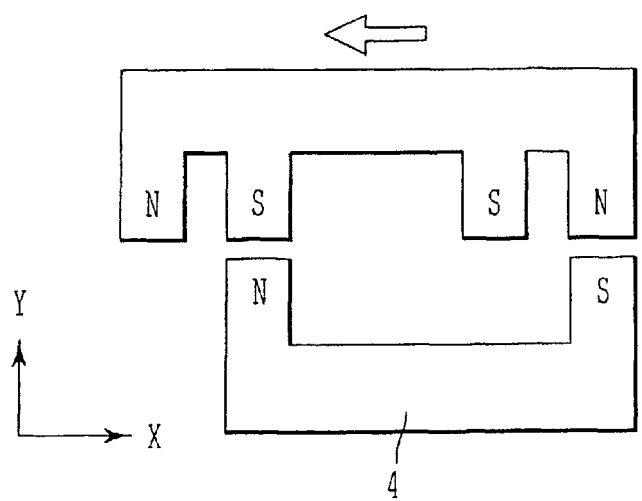

Referring to FIGS. 5(a)–5(c), basic operation of the linear actuator 2 will be described. The magnetic poles of the first and second side portions (4b and 4c) of the stator 4 changes as the current direction of current supplied to the coil 6 changes. As shown in FIG. 5(a), when coil current is zero, the moving part 8 is positioned by the spring 16 such that the center (C) of the moving part 8 along the longitudinal direction (DM) of the connecting portion (8a) of the moving part 8 coincides with the center (C) of the stator 4 along the longitudinal direction (DS) of the connecting portion (4a) of the stator 4.

When current is supplied to generate magnetic poles in the stator 4 as shown in FIG. 5(b), a magnetic force moves the moving part 8 towards right so that the opposite poles of the moving part 8 and the stator 4 align. When the current is reversed, magnetic poles of the stator 4 also reverse as in FIG. 5(c). Therefore, the magnetic force moves the moving part 8 towards left as shown in FIG. 5(c). Thus, linear oscillation motion is obtained by controlling the direction of the current supplied to the coil 6.

Figure 4C:
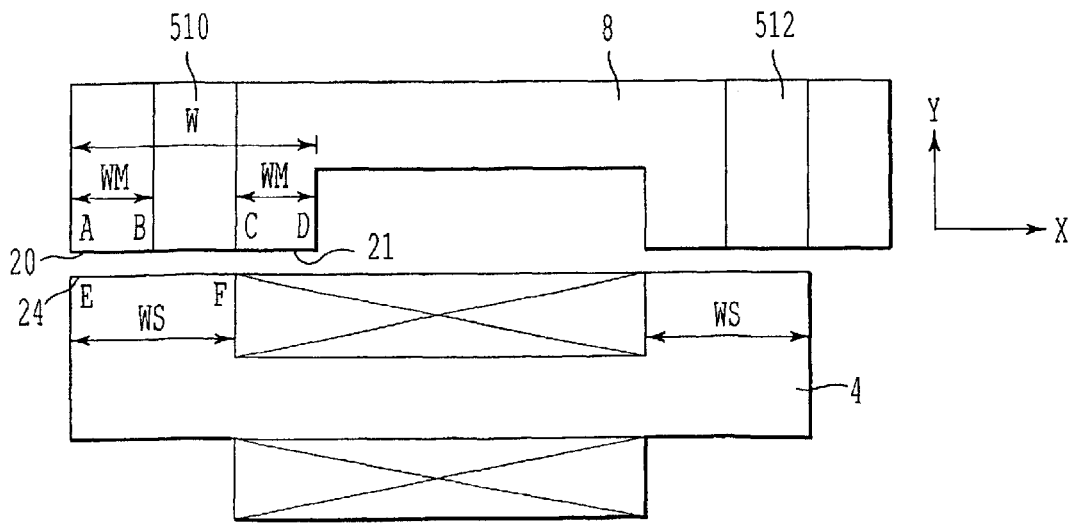
FIG. 4(c) is a cross-sectional view of the linear actuator of background art.

FIGS. 4(a) and 4(c) illustrate cross-sectional views of linear actuators which have the same permanent magnet volume, the same coil space, and the same stroke. FIG. 4(a) illustrates a cross-sectional view of the linear actuator according to the present embodiment of the present invention which has the first and second permanent magnets (10 and 12) whose cross-sections are trapezoidal. FIG. 4(c) illustrates a cross-sectional view of the linear actuator of background art which has the first and second permanent magnets (510 and 512) whose cross-sections are rectangular. Width (WM) of the poles of the moving part 8 is determined substantially equal to peak-to-peak stroke of the linear actuator 2 to obtain adequate magnetic force throughout the motion of the moving part 8. Likewise the width (WS) of the pole of the stator (4) is determined to accommodate maximum motion of the moving part 8. By using the permanent magnets having trapezoidal cross-sections, the width (W) of the first and second side portions (8b and 8c) of the moving part 8 and the width (WS) of the pole of the stator (4) may be reduced without changing the magnet volume. Accordingly, the length of the moving part 8 along the X-direction may reduce. The moving part 8 becomes not only smaller in dimensions but also lighter in weight. Further, the linear actuator 2 requires less input power to oscillate a lighter moving part 8. Furthermore, the length of the stator 4 may reduce due to the reduction of the width (WS) of the pole of the stator (4).

In general, small size is desirable in many applications of the actuator. Especially in the case of electric shaver, a flexible head is desirable in order to accommodate varying grip of the user. The actuator and blade block must have dimensions suitable to fit into the head part of the shaver so that the head part can be made rotatable with respect to the grip part. This requires a low profile and compact actuator.

Magnetic fields generated by the permanent magnets (10 and 12) increase as the thickness along the X-direction and the height along the Y-direction of the permanent magnets (10 and 12) increase. In order to obtain a sufficient magnetic field from the permanent magnets (10 and 12), either the height (the Y-direction) or the thickness (the X-direction) of the magnet is increased. However such an approach increases the overall dimensions of the actuator. In the present embodiment according to the present invention, the cross-section of each of the first and second permanent magnets (10 and 12) is trapezoidal. Accordingly, the permanent magnets (10 and 12) generate magnetic field enough to produce linear motion with sufficient force without increasing the length of the moving part 8 along the X-direction and/or the height of the moving part 8 along the Y-direction.

Figure 6:
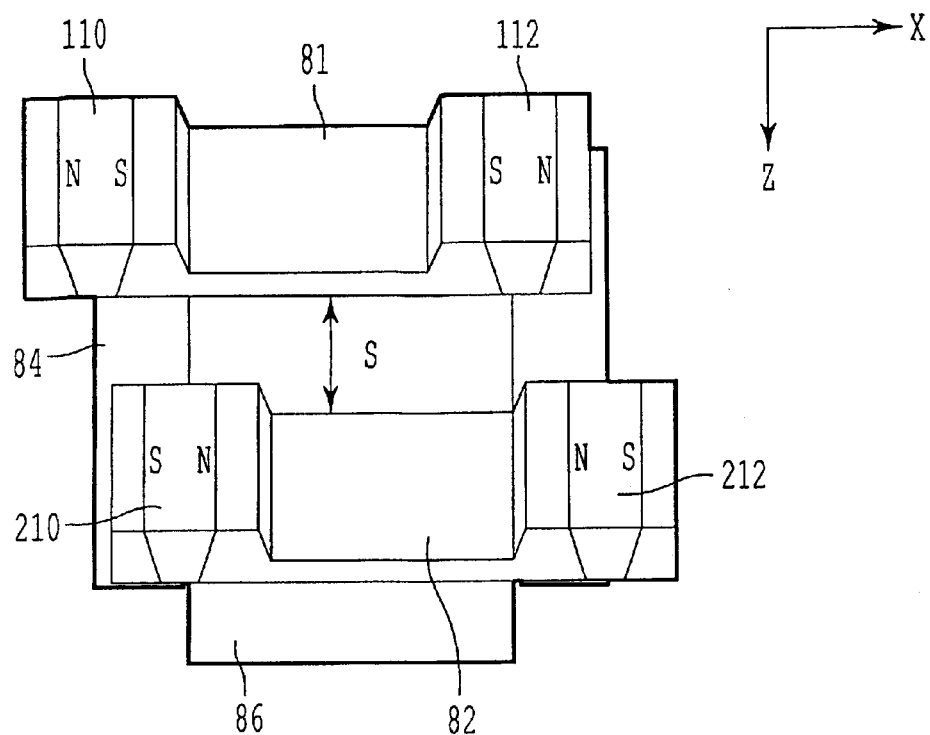
FIG. 6 is a perspective view of a linear actuator according to a second embodiment of the present invention.
Figure 7:
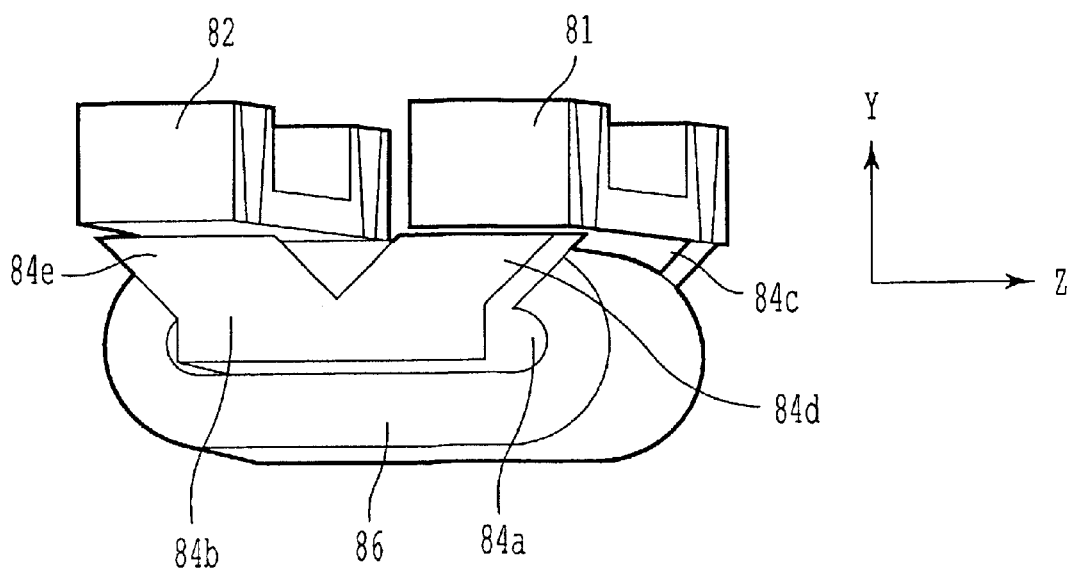
FIG. 7 is a side view of the linear actuator according to the second embodiment of the present invention.

FIGS. 6 and 7 show a linear actuator according to a second embodiment of the present invention. Referring to FIGS. 6 and 7, the linear actuator 2 includes first and second moving parts (81 and 82) which are similar to that of the first embodiment. The first and second moving parts (81 and 82) are provided to move substantially in parallel and to have a space (S) therebetween to prevent magnetic and physical interaction between the first and second moving parts (81 and 82) while in motion. The magnetization direction of the first and second permanent magnets (110 and 112) of the first moving part (81) is opposite to that of the first and second permanent magnets (210 and 212) of the second moving parts (82). Namely, in the first moving part (81), magnetic poles are arranged to be in order of N-S-S-N from left to right in FIG. 6, and in the second moving part (82), magnetic poles are arranged to be in order of S-N-N-S from left to right in FIG. 6. Therefore, the first and second moving parts (81 and 82) move in opposite directions. Namely, when the first moving part 81 moves in a (+x) direction, the second moving part 82 moves in a (−x) direction. Hence, counter linear motion of two moving parts (81 and 82) is achieved. Therefore, the overall motion of the two moving parts (81 and 82) may be balanced and the vibration of the linear actuator 2 may be reduced.

The stator 84 has first and second V-shaped side portions (84b and 84c) and a connecting portion (84a) which connects the first and second V-shaped side portions (84b and 84c). A coil 86 is wound around the connecting portion (84a). Each of the first and second V-shaped side portions (84b and 84c) has first and second poles (84d and 84e) which face the first and second moving parts (81 and 82), respectively.

The number of the moving parts is not limited to two. Depending on the requirements of an application, number of moving parts 8 can be increased to more than two.

In the second embodiment, the stator 84 has first and second V-shaped side portions (84b and 84c). Accordingly, the overall size of the linear actuator 2 may be minimized even though the space (S) is provided between the first and second moving parts (81 and 82). Further, the length of the coil 86 wound around the stator 84 may also be minimized.

Inductance of the actuator is one element to be considered from the point of view of control of input current. Actuators in the present embodiment are designed to have low inductance where possible, to permit variation of actuator current more freely. The space (S) between the first and second moving parts (81 and 82) may be adjusted without affecting coil dimensions.

Figure 8:
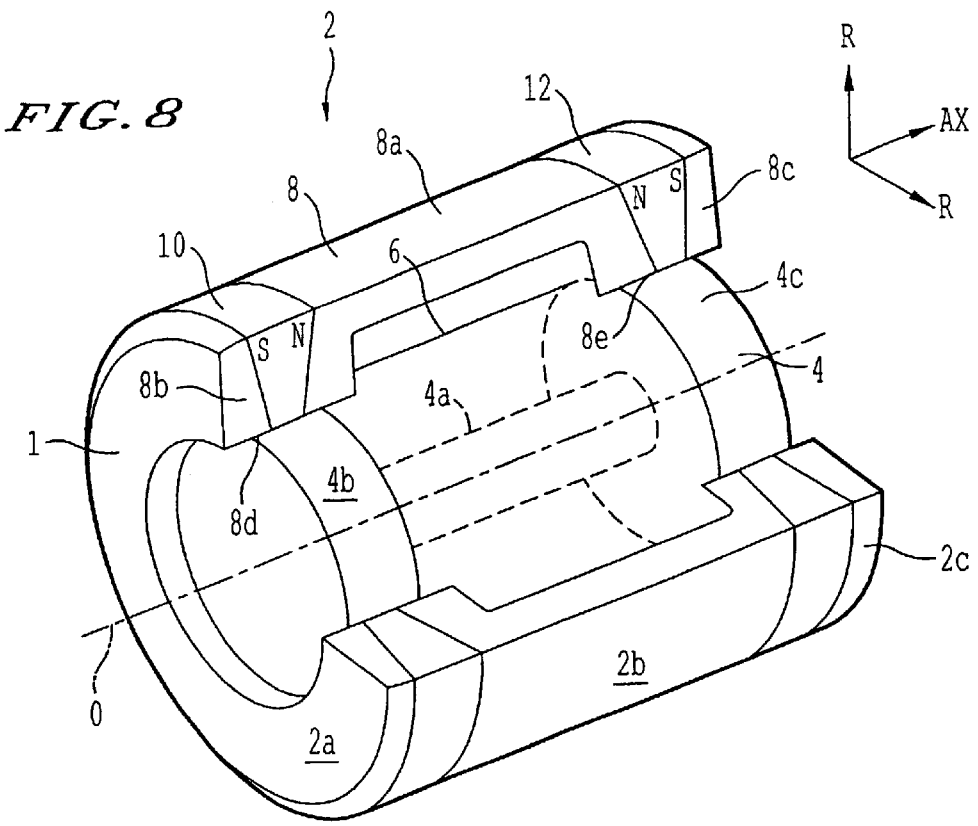
FIG. 8 is a perspective view of a linear actuator according to a third embodiment of the present invention.

FIG. 8 shows a linear actuator according to a third embodiment of the present invention. Referring to FIG. 8, the linear actuator 2 includes a stator 4, a coil 6, and a cylindrical moving part 8. The stator 4 is made of a soft magnetic material of high permeability. The stator 4 has first and second disc-shaped side portions (4b and 4c) and a connecting portion (4a) connecting the first and second disc-shaped side portions (4b and 4c). The coil 6 is wound around the connecting portion (4a) of the stator 4. The cylindrical moving part 8 has a U-shaped cross-section which has first and second side portions (8b and 8c) and a connecting portion (8a).

The stator 4 is inserted into the cylindrical moving part 8 such that the center axis (O) of the stator 4 coincides with the center axis (O) of the cylindrical moving part 8 and such that inner circumferential surfaces (8d and 8e) of the first and second side portions (8b and 8c) of the cylindrical moving part 8 face the outer circumferential surfaces of the first and second disc-shaped side portions (4b and 4c) of the stator 4, respectively, with an air gap. The moving part 8 is linearly movable along the axis (O) of the cylindrical moving part 8.

The cylindrical moving part 8 is made of made of soft magnetic material and includes first and second permanent magnets (10 and 12) provided in the first and second side portions (8b and 8c), respectively. The first and second side portions (8b and 8c) and the connecting portion (8a) of the cylindrical moving part 8 guide the magnetic field lines emanating from the permanent magnets (10 and 12) and the coil 6. The first and second permanent magnets (10 and 12) are magnetized substantially along the axial direction (O) of the moving part 8. The magnetization directions of the first and second magnets (10 and 12) are opposite. Namely, the first and second permanent magnets (10 and 12) are provided such that, for example, magnetic poles are arranged to be in order of S-N-N-S from left to right in FIG. 8.

Referring to FIG. 8, the cross-section of each of the first and second permanent magnets (10 and 12) is trapezoidal. Each of the first and second permanent magnets (10 and 12) is provided such that a narrower base of the trapezoid is positioned substantially on the inner circumferential surfaces of the first and second side portions (8b and 8c) of the moving part 8 and a wider base of the trapezoid is positioned substantially on the outer circumferential surfaces of the first and second side portions (8b and 8c).

Magnetic fields generated by the permanent magnets (10 and 12) increase as the thickness along an axial direction (AX) and the height along a radial direction (R) of the permanent magnets (10 and 12) increase.

Figure 9:
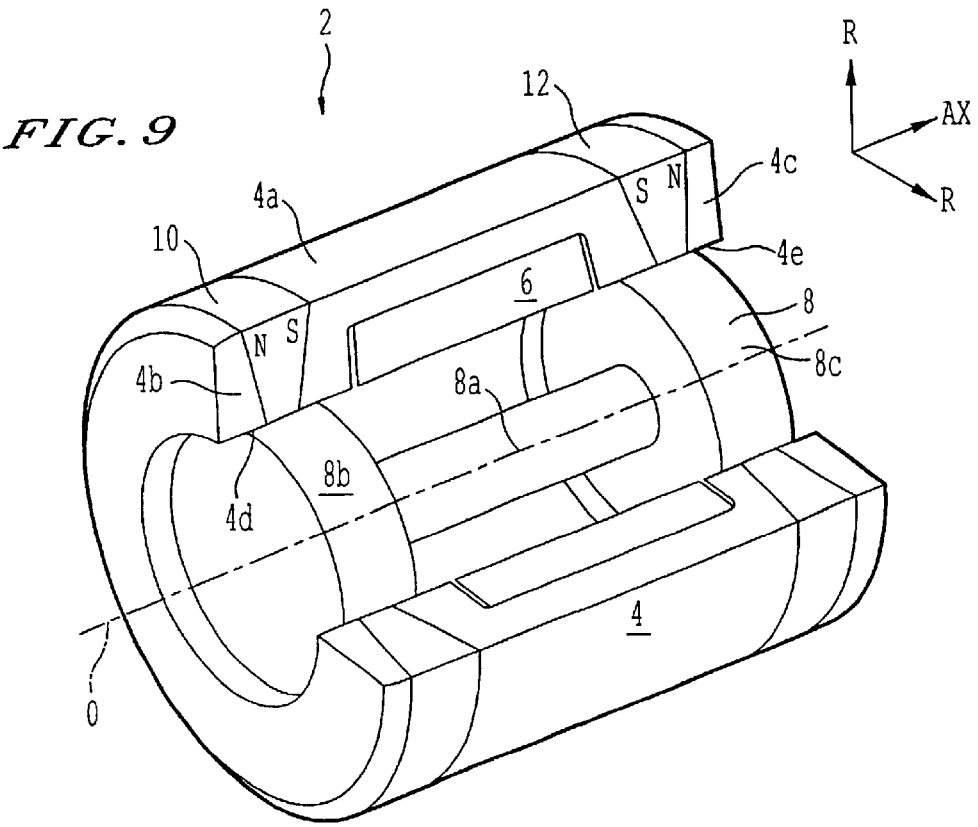
FIG. 9 is a perspective view of a linear actuator according to a fourth embodiment of the present invention.

FIG. 9 shows a linear actuator according to a fourth embodiment of the present invention. Referring to FIG. 9, the linear actuator 2 includes a cylindrical stator 4, a coil 6, and a moving part 8. The stator 4 is made of a soft magnetic material of high permeability. The stator 4 has a U-shaped cross-section which has first and second side portions (4b and 4c) and a connecting portion (4a) connecting the first and second side portions (4b and 4c). The coil 6 is provided along the inner circumferential surface of the connecting portion (4a) of the cylindrical stator 4 between the first and second side portions (4b and 4c). The moving part 8 has first and second disc-shaped side portions (8b and 8c) and a connecting portion (8a) connecting the first and second disc-shaped side portions (8b and 8c).

The moving part 8 is inserted into the cylindrical stator 4 such that the center axis (O) of the cylindrical stator 4 coincides with the center axis (O) of the moving part 8 and such that inner circumferential surfaces (4d and 4e) of the first and second side portions (4b and 4c) of the stator 4 face the outer circumferential surfaces of the first and second disc-shaped side portions (8b and 8c) of the moving part 8, respectively, with an air gap. The moving part 8 is linearly movable along the axis (O) of the moving part 8.

The stator 4 is made of made of soft magnetic material and includes first and second permanent magnets (10 and 12) provided in the first and second side portions (4b and 4c), respectively. The first and second permanent magnets (10 and 12) are magnetized substantially along the axial direction (O) of the stator 4. The magnetization directions of the first and second magnets (10 and 12) are opposite. Namely, the first and second permanent magnets (10 and 12) are provided such that, for example, magnetic poles are arranged to be in order of N-S-S-N from left to right in FIG. 9.

Referring to FIG. 9, the cross-section of each of the first and second permanent magnets (10 and 12) is trapezoidal. Each of the first and second permanent magnets (10 and 12) is provided such that a narrower base of the trapezoid is positioned substantially on the inner circumferential surfaces of the first and second side portions (4b and 4c) of the stator 4 and a wider base of the trapezoid is positioned substantially on the outer circumferential surfaces of the first and second side portions (4b and 4c).

Cylindrical designs provide flexibility in terms of selecting either the inner or the outer part as the moving part.

Figure 10:
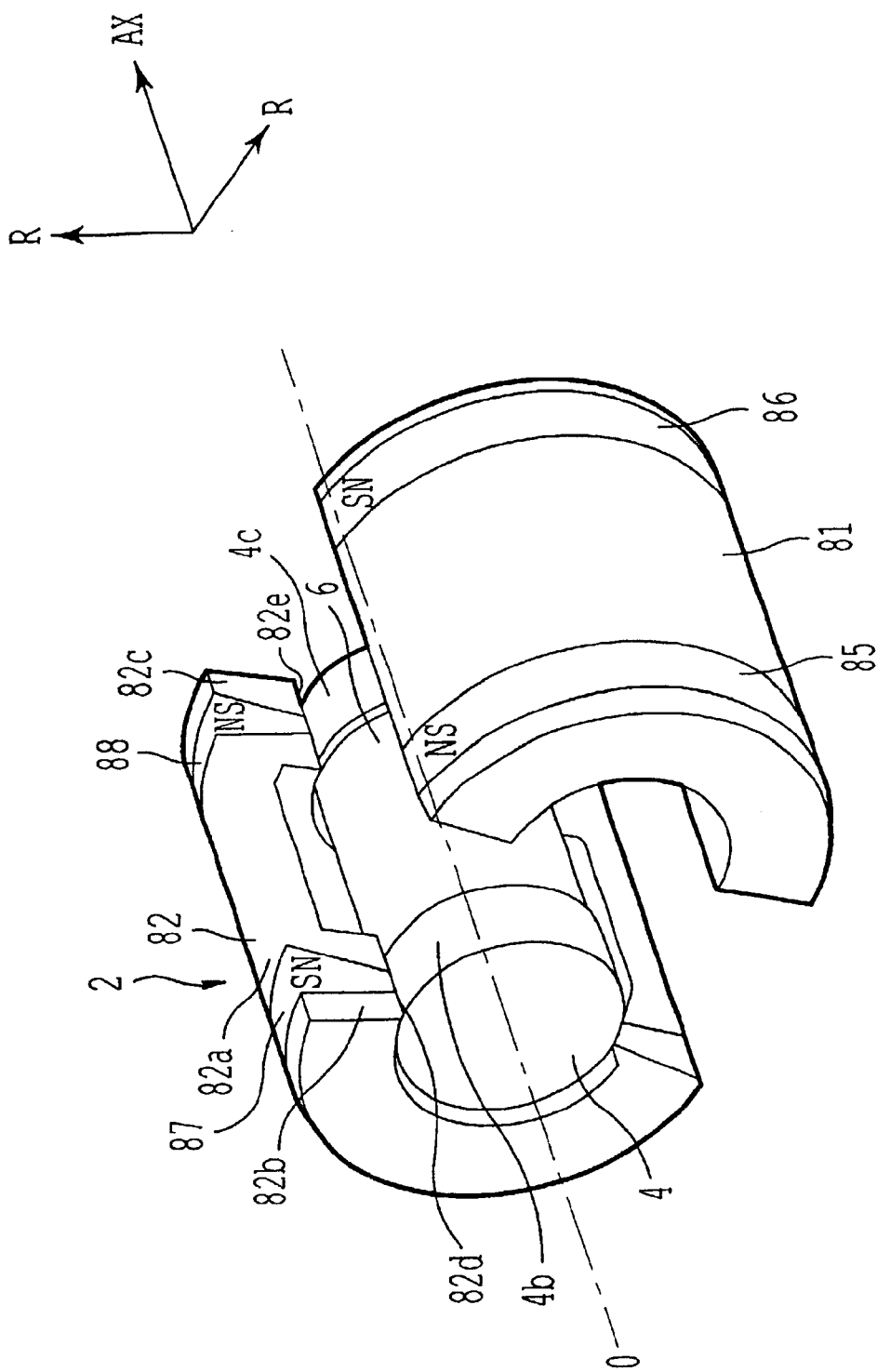
FIG. 10 is a disassembled perspective view of a linear actuator according to a fifth embodiment of the present invention.

FIG. 10 shows a linear actuator according to a fifth embodiment of the present invention. Referring to FIG. 10, the linear actuator 2 includes a stator 4, a coil 6, and first and second cylindrical moving parts (81 and 82). The first and second cylindrical moving parts (81 and 82) are half cylinders. The first and second cylindrical moving parts (81 and 82) are arranged to form a cylinder. The stator 4 has a construction similar to the stator 4 disclosed in the embodiment as shown in FIG. 8. Each of the first and second cylindrical moving parts (81 and 82) has a U-shaped cross-section which has first and second side portions (82b and 82c) and a connecting portion (82a). The first cylindrical moving part 81 includes first and second permanent magnets (85 and 86). The second cylindrical moving part 82 also includes first and second permanent magnets (87 and 88).

The stator 4 is inserted into the cylinder constituted by the first and second cylindrical moving parts (81 and 82) such that the center axis (O) of the stator 4 coincides with the center axis (O) of the cylinder and such that inner circumferential surfaces (82d and 82e) of the first and second side portions (82b and 82c) of the first and second cylindrical moving parts (81 and 82) face the outer circumferential surfaces of the first and second disc-shaped side portions (4b and 4c) of the stator 4, respectively, with an air gap. The magnetization direction of the first and second permanent magnets (85 and 86) of the first cylindrical moving part (81) is opposite to that of the first and second permanent magnets (87 and 88) of the second cylindrical moving part (82). Namely, in the first cylindrical moving part (81), magnetic poles are arranged to be in order of N-S-S-N from left to right in FIG. 10, and in the second cylindrical moving part (82), magnetic poles are arranged to be in order of S-N-N-S from left to right in FIG. 10. Therefore, the first and second cylindrical moving parts (81 and 82) move substantially in parallel and in opposite directions. Namely, when the first cylindrical moving part 81 moves in (+AX) direction, the second cylindrical moving part 82 moves in (−AX) direction. Hence, counter linear motion of two cylindrical moving parts (81 and 82) is achieved. Therefore, the overall motion of the two moving parts (81 and 82) may be balanced and the vibration of the linear actuator 2 may be reduced.

In the above described embodiments of the present invention, although the first and second permanent magnets (10 and 12) have cross-sections which are trapezoidal, the cross-section is not limited to a trapezoidal shape as long as an area of the cross-section reduces toward the magnet surface.

Figure 11:
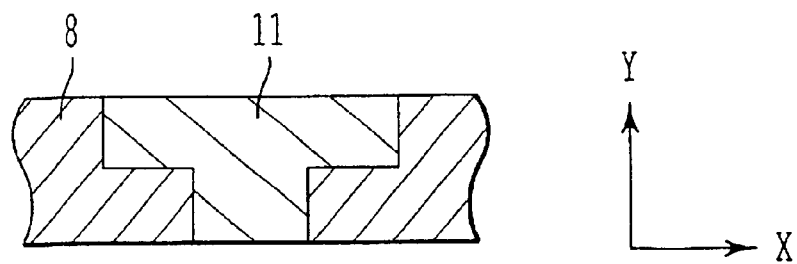
FIGS. 11–13 are cross-sectional views of permanent magnets of a linear actuator according to an embodiment of the present invention.
Figure 12:
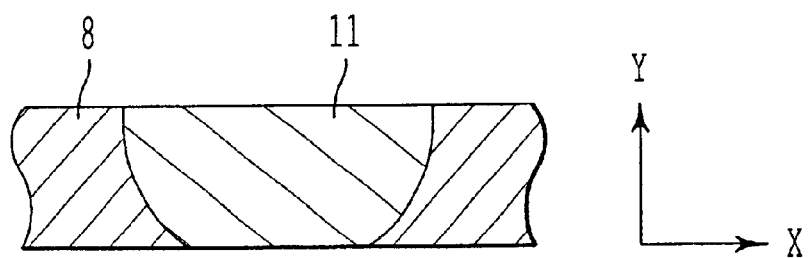
Figure 13:
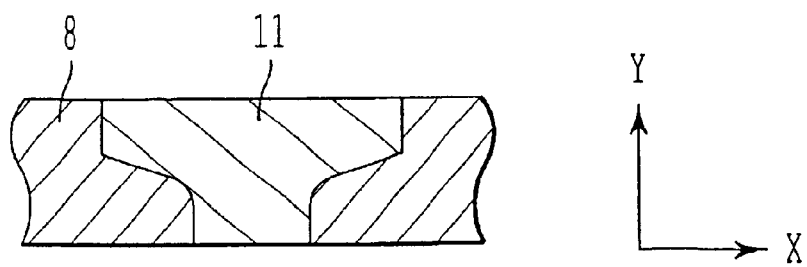

For example, referring to FIG. 11, the cross-section of the permanent magnet 11 has a stepped-shape. Referring to FIG. 12, the cross-sectional area of the permanent magnet 11 reduces toward the magnet surface along a curved line. Referring to FIG. 13, the cross-sectional area of the permanent magnet 11 reduces toward the magnet surface along a curved line and a straight line.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the united states is:

1. A linear actuator comprising:
   at least one stator having a stator facing surface;
   at least one moving part having a moving part facing surface facing the stator facing surface, the at least one moving part being linearly movable with respect to the stator,
   a coil provided in the stator;
   at least one permanent magnet provided in one of the stator or the moving part and having a magnet surface facing the moving part facing surface or the stator facing surface, a cross-sectional area of the permanent magnet taken along a first plane substantially in parallel with the magnet surface reducing toward the magnet surface; and
   an elastic member elastically supporting the moving part.

2. A linear actuator according to claim 1, wherein a cross-section of the at least one permanent magnet along a second plane substantially in parallel with a linear moving direction of the at least one moving part and substantially perpendicular to the first plane is a trapezoid whose narrower base is on the magnet surface.

3. A linear actuator according to claim 1, wherein a cross-section of the at least one permanent magnet along a second plane substantially in parallel with a linear moving direction of the at least one moving part and substantially perpendicular to the first plane has a stepped-shape.

4. A linear actuator according to claim 1, wherein the cross-sectional area of the at least one permanent magnet reduces toward the magnet surface along a curved line.

5. A linear actuator according to claim 1, wherein the cross-sectional area of the at least one permanent magnet reduces toward the magnet surface along a straight line.

6. A linear actuator according to claim 1, wherein the linear actuator comprises first and second moving parts which arc configured to move in substantially parallel and in opposite directions.

7. A linear actuator according to claim 6, wherein the stator comprises,
   first and second V-shaped side portions each of which has first and second poles which face the first and second moving parts, respectively, and
   a connecting portion connecting the first and second V-shaped side portions, the coil being wound around the connecting portion.

8. A linear actuator according to claim 6, wherein the first and second moving parts are half cylinders which are arranged to form a cylinder and wherein the stator is provided in the cylinder.

9. A linear actuator according to claim 1, wherein the at least one moving part is cylindrical and wherein the stator is provided in the at least one moving part.

10. A linear actuator according to claim 9, wherein the stator comprises,
    first and second disc-shaped portions, and
    a connecting portion connecting the first and second disc-shaped portions, the coil being wound around the connecting portion.

11. A linear actuator according to claim 1, wherein the stator is cylindrical and wherein the at least one moving part is provided in the stator.

12. A linear actuator according to claim 11, wherein the at least one moving part comprises,
    first and second disc-shaped portions, and
    a connecting portion connecting the first and second disc-shaped portions.

13. A linear actuator according to claim 1, wherein the stator is made of a soft magnetic material.

14. A linear actuator according to claim 1, wherein the moving part is made of a soft magnetic material.

15. A linear actuator according to claim 1, wherein the at least one permanent magnet is provided in the at least one moving pant and wherein a length of the stator facing surface is substantially equal to a sum of a predetermined stroke of the at least one moving part and a length of the magnet surface along a moving direction of the at least one moving part.

16. A linear actuator according to claim 1, wherein at least one permanent magnet is provided in the at least one moving part and wherein a length of the moving part facing surface is substantially equal to a predetermined stroke of the at least one moving part and a length of the magnet surface along a moving direction of the at least one moving part.

17. A linear actuator according to claim 6, wherein a first permanent magnet is provided in the first moving part and a second permanent magnet is provided in the second moving part, and wherein a magnetization direction of the first permanent magnet is opposite to a magnetization direction of the second permanent magnet.

18. An electric appliance comprising:
    a linear actuator comprising:
       at least one stator having a stator facing surface;
       at least one moving part having a moving part facing surface facing the stator facing surface, the at least one moving part being linearly movable with respect to the stator;
       a coil provided in the stator;
       at least one permanent magnet provided in one of the stator or the moving part and having a magnet surface facing the moving part facing surface or the stator facing surface, a cross-sectional area of the permanent magnet taken along a first plane substantially in parallel with the magnet surface reducing toward the magnet surface; and an elastic member elastically supporting the moving part.

* * * * *